(12) United States Patent
Goodson

(10) Patent No.: US 6,458,423 B1
(45) Date of Patent: Oct. 1, 2002

(54) SPRAYABLE PHOSPHATE CEMENTITIOUS COATINGS AND A METHOD AND APPARATUS FOR THE PRODUCTION THEREOF

(76) Inventor: David M. Goodson, 313 W. Fourth St., Hinsdale, IL (US) 60521

( * ) Notice: Subject to any disclaimer, the term of this patent is extended or adjusted under 35 U.S.C. 154(b) by 111 days.

(21) Appl. No.: 09/631,445

(22) Filed: Aug. 2, 2000

Related U.S. Application Data

(60) Provisional application No. 60/146,912, filed on Aug. 3, 1999.

(51) Int. Cl.⁷ .................................................. B05D 1/36
(52) U.S. Cl. ........................ 427/403; 106/690; 106/691; 427/421; 427/422; 427/426; 427/427; 428/688
(58) Field of Search ............................... 428/688, 621; 106/690, 691; 427/403, 421, 422, 426, 427

(56) References Cited

U.S. PATENT DOCUMENTS

| | | | |
|---|---|---|---|
| 2,532,155 A | 11/1950 | Ensign | |
| 3,360,594 A | 12/1967 | Criss | |
| 3,720,527 A | 3/1973 | Farrauto et al. | 106/85 |
| 4,003,761 A | 1/1977 | Gotta et al. | 148/6.15 |
| 4,057,528 A | 11/1977 | Hunt | 260/29.7 |
| 4,188,231 A | 2/1980 | Valore | 106/90 |
| 4,287,242 A | 9/1981 | Monden et al. | 427/426 |
| 4,504,315 A | 3/1985 | Alleman et al. | |
| 4,758,278 A | 7/1988 | Tomic | 106/85 |
| 4,772,327 A | 9/1988 | Allemann et al. | 106/90 |
| 4,822,421 A | 4/1989 | Crabb | 106/89 |
| 4,836,854 A * | 6/1989 | Bierman et al. | 106/691 |
| 4,931,097 A | 6/1990 | Band | 106/672 |
| 4,983,220 A | 1/1991 | Mathieu | 106/692 |
| 5,073,198 A | 12/1991 | Kurz | 106/791 |
| 5,082,501 A | 1/1992 | Kurz | 106/789 |
| 5,268,032 A | 12/1993 | Malone et al. | 106/723 |
| 5,302,563 A | 4/1994 | Rumpeltin et al. | 501/111 |
| 5,389,144 A | 2/1995 | Burge et al. | 106/737 |
| 5,401,538 A | 3/1995 | Perito | 427/403 |
| 5,514,430 A | 5/1996 | Andersen et al. | 428/34.4 |
| 5,543,186 A | 8/1996 | Andersen et al. | 428/34.4 |
| 5,624,980 A | 4/1997 | Kobori | |
| 5,641,815 A | 6/1997 | Fehlmann | 521/154 |
| 5,824,148 A | 10/1998 | Cornwell | |
| 5,830,815 A | 11/1998 | Wagh et al. | 501/155 |
| 5,846,894 A | 12/1998 | Singh et al. | 501/155 |
| 5,852,077 A | 12/1998 | Zawada et al. | 524/8 |
| 5,895,688 A | 4/1999 | Bertoncini et al. | 427/421 |
| 5,897,943 A | 4/1999 | Rohatgi | 428/307.3 |
| 5,911,819 A | 6/1999 | Drs et al. | 106/809 |
| 5,954,867 A | 9/1999 | Chow et al. | 106/35 |
| 6,204,214 B1 | 3/2001 | Singh et al. | 501/155 |

* cited by examiner

Primary Examiner—Robert R. Koehler

(57) ABSTRACT

A sprayed-on phosphate cement coating formed from the combination and reaction of a phosphoric acid solution and a base metal solution. The acid solution and base solution may be intermixed prior to spraying, during spraying, or on a substrate. The curing reaction rate of the phosphate cement coating and its final physical properties may be controlled by adding various retardants, accelerants, reducers, wetting agents, superplasticizers, buffers, water reducers, adhesive agents, hardening agents, and/or sequestrants to the precursor solutions. The curing rate and properties of the cement coating may be further controlled by adjusting the temperature of the precursor solutions and/or the target substrate.

16 Claims, 3 Drawing Sheets

SPRAYABLE PHOSPHATE CEMENTITIOUS COATINGS AND A METHOD AND APPARATUS FOR THE PRODUCTION THEREOF

CROSS-REFERENCE TO RELATED APPLICATIONS

This application claims priority to U.S. Provisional Application Serial No. 60/146,912 filed Aug. 3, 1999.

TECHNICAL FIELD OF THE INVENTION

The present invention relates generally to ceramic materials and, more particularly, to sprayable phosphate cement coatings and a novel method and apparatus for producing them.

BACKGROUND OF THE INVENTION

Ceramic cements are mixtures of water and reactive metal oxides that harden and fasten upon setting. Cements have a variety of familiar uses, such as the adhesive component to concrete (essentially an agglomeration of rocks held together by cement), the bonding layer that holds bricks together to form walls, as structural building materials such as patio or garage slabs. The cement of choice for most of these familiar uses is Portland cement, a mixture of water and calcined lime and silica. Upon curing, the primary constituents of Portland cement are dicalcium silicate and tri-calcium silicate phases. Portland cement has the advantage of being cheap to produce and relatively easy to mix and pour. Part of the reason Portland cement is so cheap is because the silica component may come from a wide variety of sources, usually silica-containing clays, and also because these clays do not have to be especially pure or consistent.

Portland cement also suffers from some disadvantages, inconsistency of physical properties arising from the inherent inconsistency of the source materials (both in composition and quality) being chief among them. Portland cements also have the disadvantage of having a relatively high viscosity. While they are well adapted to pouring and spreading, Portland cements are not well suited for pumping and spraying. Moreover, Portland cements are characterized by a relatively slow curing time. Another disadvantage of Portland cement is that it does not bond well to itself, especially if the existing cement surface is already hardened. Portland cement-containing structures, such as cement driveways or road segments, must be formed in essentially one step. If there is an interruption in the forming of a Portland cement body sufficient to allow the cement to begin to cure, a structural discontinuity or "cold joint" can result. Moreover, Portland cement cannot be used to patch a Portland cement structure absent costly and time consuming surface pre-treatment at the patch interface. While Portland cement is usually applied by pouring from a mixer or by spreading from a palette, it can also be sprayed. Sprayed Portland cement, or "shotcrete", is applied as a thick, rough layer of cement only in industrial applications that do not necessitate even or controlled coating, such as "shotcreting" over wire mesh for producing the foundations of swimming pools and for walls of tunnels and mines. Shotcrete is applied in very thick rough coats through enormous and expensive pneumatic sprayers and pumps that are not suited for smaller scale applications. Shotcrete sprayers cannot produce thin coatings or smooth finishes, and shotcreted surfaces sacrifice aesthetics for functionality. Portland cements set up and harden very slowly and are fairly porous, especially to road salt, which can degrade and rust steel reinforcement members in the concrete, causing expansion of the reinforcement members and the eventual rupture of the cement from within.

Another kind of cement is phosphate cement. Phosphate cements undergo an acid-base reaction during curing. Typically, the acid component is either phosphoric acid (usually in liquid form) or an alkali-earth phosphate salt such as magnesium phosphate, calcium phosphate or ammonium phosphate. The base component is typically dead burned magnesium oxide. The compositions of the acid and base pair are chosen such that the resulting combination will react to form a cementitious metal-phosphate. The acid and base components when mixed rapidly cure to form a cementitious metal phosphate phase. The phosphate cement forms by a highly exothermic reaction and sets up rapidly, quickly agglomerating and increasing in viscosity.

Most phosphate cements have excellent strength and hardness characteristics, and have the additional advantage of adhering to most other materials, including cement (both phosphate and Portland), brick, metal, wood, most wood products, insulation, asphalt, roofing materials, membranes and some glasses. Phosphate cements also have excellent chemical stability and compressive strength, and have toughness characteristics superior to those of Portland cement. Moreover, phosphate cements tend to set up with little or no open porosity and therefore can be used to form waterproof forms and seals. Phosphate cements, like most ceramics, are fireproof and tend to be electrically nonconductive and good thermal and acoustic insulators.

Traditionally, phosphate cements have been used almost exclusively for dental and biological applications, road patching, and specialized refractory applications. This is because phosphate cements are roughly an order of magnitude more expensive than Portland cement and cannot be used in bulk because the highly exothermic nature of the phosphate reaction causes phosphate cements to set up rapidly and to agglomerate, while generating a lot of heat. Unlike in Portland cement, where the heat of hydration evolves slowly and plateaus, the heat of hydration of phosphate cements spikes quickly, with great heat evolution occurring promptly after the cement is mixed. This results in the phosphate cement setting up too quickly to be workable. There are a variety of coating applications (fireproofing, water and fluid sealants, electrical insulation foam, electrical insulation coatings, thermal insulation coatings, chemical insulation coatings, rust proofing, overcoating existing roofs, walls, drywall, siding, floors, basements, roads and the like) that could be addressed by a thin or thick ceramic coating of a material having the properties of phosphate cement, but currently the technology does not exist to commercially apply thin cement coatings and, more particularly, to spray phosphate cements coatings. While the superior properties of phosphate cements would make them desirable for a much wider range of applications, their reactivity makes them ill-suited for bulk mixing, dipping, brushing, rolling and spraying since they tend to thicken and agglomerate quickly, rapidly clogging and packing spray nozzles, needle valves, hoses, and containers. This makes phosphate cements impractical for spraying, especially since most commercial spray apparati have orifices and conduits too small to accommodate the flow of a liquid having the density and viscosity of a phosphate cement. Further, most commercial spray apparati are expensive, and would be ruined by phosphate cements setting up in their hoses, nozzles, and containers, making their usage with phosphate cements impractical. Moreover, since ejecting the phosphate cement is the primary method of dissipating the excess waste heat generated by the acid-base reaction, a clogged spray line or nozzle can contribute to the overheating of the sprayer system, therefore increasing the hazard of fire or an explosion of the closed container. Further, overheating of the cement mixture in the sprayer also increases the reaction rate, thereby evolving even more heat and potentially causing further agglomeration in the spray gun and hoses resulting in a catastrophic runaway reaction.

There are currently no known cements capable of being applied as a thin, sprayed on coating or layer. There are also currently no known phosphate cement compositions that may be applied to a substrate by conventional spraying, coating, dipping or brushing techniques. There is therefore a need for a phosphate cement material with a controllably slow reaction and curing rate that can be mixed in bulk with a stable, low viscosity suitable for application as a thin coating via sprayer or via conventional application techniques. The present invention addresses this need.

SUMMARY OF THE INVENTION

One form of the present invention relates to a phosphate cement composition with a sufficiently controlled reaction rate that the phosphate cement may be mixed in bulk and with suitable viscosity to be sprayed. Another form of the present invention relates to a method and apparatus for mixing and spray applying a phosphate cement composition.

One object of the present invention is to provide an improved cement. Related objects and advantages will be apparent from the following description.

DETAILED DESCRIPTION OF THE PREFERRED EMBODIMENT

Figure 1:
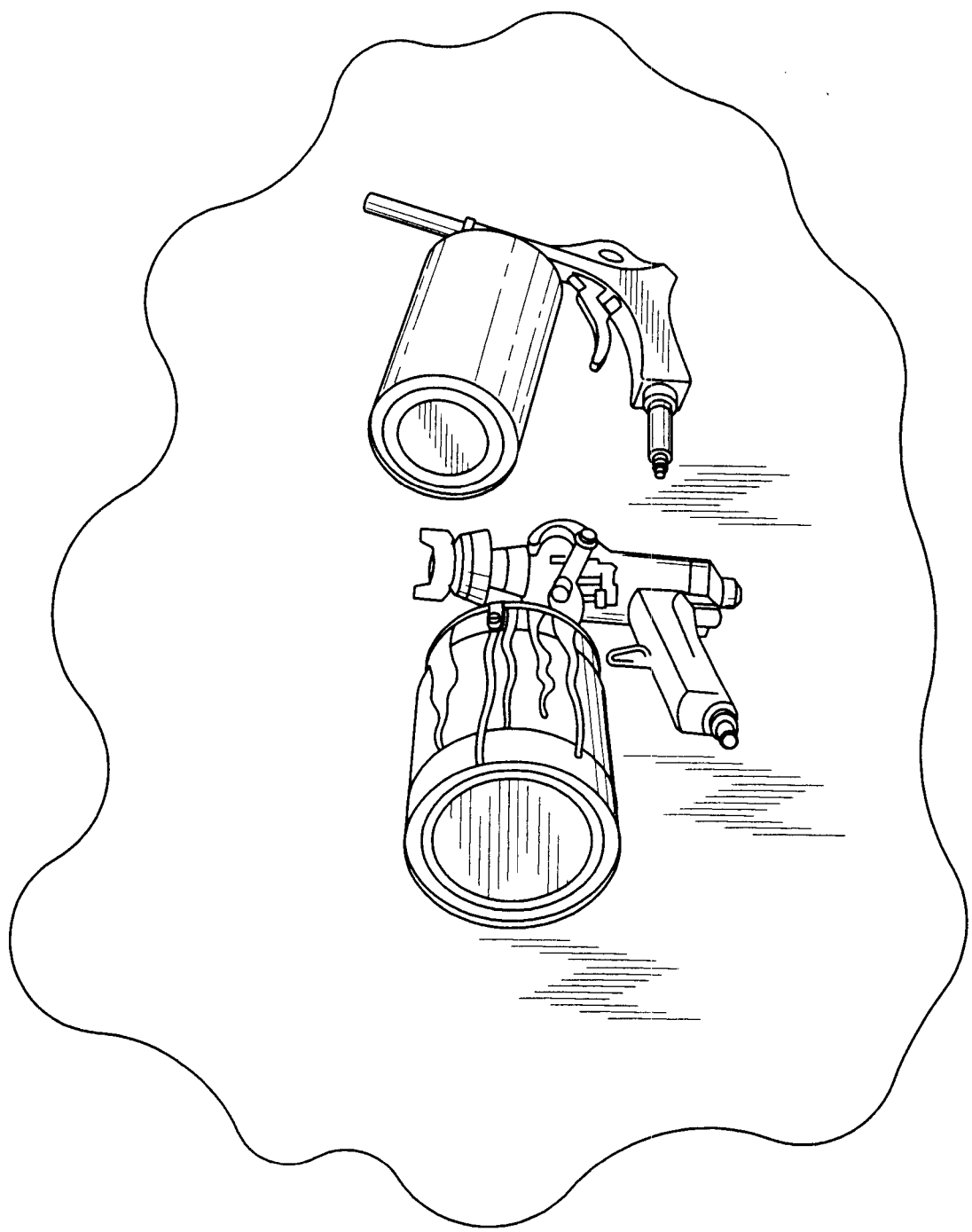
FIG. 1 is a perspective view of a commercial embodiment of a prior art spray gun apparatus.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

General Composition and Criteria for Maintaining Sprayability

The present invention relates to a sprayable phosphate cement material with a controlled curing reaction time and viscosity. The cement composition includes a phosphoric acid component, a metallic alkali or base component, and water. The phosphoric acid component and the metallic base component are mixed with water separately to form component slurries (i.e., an acid slurry and a base slurry), and each slurry is maintained separately until the application step. The acid and base slurries may each be thought of a first and/or second precursor constituent of the phosphate cement composition. Depending upon the order of usage, either could be the first or second constituent. The application step preferentially involves first coating a desired surface with the phosphoric acid mixture and then with the metallic base slurry. Alternately, the application step may involve first coating the desired surface with the base slurry and then the phosphoric acid solution, or simultaneously spraying the desired surface with the both the phosphoric acid solution and the base slurry from separate sources, wherein the acid and base components mix in transit or in situ on the desired surface.

Preferentially water, metallic base and one or more retardants, emulsfiers, deflocculents, sequestrants and/or dispersants are added to cold water and mixed in with the silica source(s) to form a slurry. Next, the liquid phosphoric acid or phosphate salts are quickly mixed into the slurry, and the slurry is then preferably immediately sprayed onto a desired target, although the use of cold precursors and strong retarders can extend the shelf-life of the mixed phosphate cement slurry such that immediate spraying is not a requirement. Alternately, with the use of strong retardant additives, dry powder phosphate salts, silica sources, and metallic oxide alkali powders can be mixed together to form a slurry having a long enough shelf-life to make spraying possible.

After the phosphoric acid and the metallic base components are mixed, the phosphate cement slurry is preferably used promptly. The individual cement components may be mixed in spray cans or any clean containers and mixed right on the job, preferably in a cool environment. Preferably, the water used in the mixture is added cold in order to retard the progression of the exothermic acid-base phosphate cement-forming reaction.

Alternately, the phosphoric acid and/or the base coat may be brushed on, with the other coat also either sprayed or brushed on. One coat of the slurry with acid and base and silica sources is usually enough to provide good coverage, although subsequent coats are easy to apply and may be applied immediately after the first coat is applied. This material may also be rolled on.

In the preferred embodiment, the phosphoric acid coating is applied first. More preferably, the phosphoric acid coat contains a silica source admixed therein.

Alternatively, the base coating is applied, preferably by spraying, such that it penetrates the existing phosphoric acid layer and allows the cementitious reaction to begin.

The reaction progresses rapidly since the reactants are spread as a thin coating over a large surface area. Also, the heat generated by the reaction is dissipated quickly, again because the reaction occurs over a large area and is generated in a thinly spread film having a very high surface area to volume ratio.

In an alternate embodiment, the base coat is applied first, followed by the phosphoric acid coat, thereby catalyzing the in-place base slurry.

Some preferred phosphoric acid components include potassium phosphate, magnesium phosphate, sodium phosphate, aluminum phosphate, ammonium phosphate, iron phosphate, zinc phosphate and combinations thereof. By using controlled combinations of different phosphate salts, each one spiking in temperature at a different time, the overall temperature profile of the composition is controlled so as to substantially minimize the maximum temperature reached. Therefore, the controlled combination of the above-listed phosphate salts has the same effect as the addition of a temperature retarder. In addition the resultant mix of different shaped and size crystals can yield denser packing and gives a "granite effect" to a composition formed therefrom, whereby the composition has improved fracture strength as cracks cannot as easily propagate through a composition with no common cleavage lines.

The phosphoric acid component may be either a solid (preferably a powder) or a liquid. Some preferred metallic base components include magnesium oxide, dolomite, zinc oxide, aluminum oxide, potash, calcium oxide, lithium carbonate, barium carbonate, molybdenum oxide, calcium hydroxide, aluminum hydroxide, tin oxide, nickel oxide, magnesium hydroxide, iron oxide, titanium oxide, dolomite, manganese oxide, zirconium oxide, zirconium hydroxide, and wood ash.

One means of controlling the reaction rate of the cement is by controlling the temperatures of the cement components. The colder one or both of the components are kept, the slower the reaction progresses. One way of controlling the temperature of the phosphoric acid component and the metallic base component is by cooling the water used in the admixture of each. Another means of temperature control is cooling one or both of the components' containers and/or the spraying apparatus, such is in an ice bath or by refrigeration. Another means of controlling the reaction rate is to keep the surface to be sprayed cold, such as with ice or cold water or dry ice. Various combinations of these cooling techniques may be employed to obtain maximum temperature control of the reaction.

Another means of controlling the reaction rate is the use of the retarders (surfactants, retarders, dispersants, water reducers, super plasticizers, and sequestrants) in the cement-forming components. Preferably, the retarders are added to the water before it is added to the powdered phosphoric acid solution and/or the metallic base precursors (minerals, metal oxides, and the like) to form the base slurry. This approach provides that no water contacts the component materials (usually powders) without a dispersant/retarder present. Since cement-forming powders are reactive, the retarders slow the setting time by keeping them apart, eliminating or reducing rapid agglomeration and aiding to control the reaction of the cement.

Another embodiment of the present invention contemplates pre-mixing the phosphoric acid solution and the metallic base slurry before spraying. In this embodiment, it becomes necessary to reduce the reaction rate of the cement sufficiently to keep the mixed cement slurry from becoming too viscous to remain sprayable as a thin coating. This is achieved through cooling the mixed solution, by using chilled water and/or refrigeration of the container and sprayer and/or through the use of retarders. As above, retarders are used to keep the component particles dispersed in order to slow the chemical reaction and prevent agglomerations from forming inside the sprayer. Another method of controlling the speed of the phosphate cement-forming reaction is through the use of pH buffers to regulate the pH of the solution and thereby its reaction rate. Yet another means of regulating the reaction rate is by controlling the concentration of the acid and base components or, conversely, the water component. Increasing the water concentration will slow the reaction rate of the cement. Traditionally phosphate cement manufacturers want a low water/cement ratio as they believe that like Portland cement, the lower the w/c ratio the greater the compressive strength. Through the addition of more mix water, the crystals continue to grow/form as long as there is unreacted acid and base present, the extra water facilitating exchange of unreacted acid and base ions for continued hardening and pore filling.

It is preferred that the phosphate cement be mixed thoroughly. If an even stronger and less porous cement is desired, it is more preferred that a plastic resin and/or catalyst/initiator be admixed therein to yield a strong phosphate cement that is less porous and more water resistant. The additions of MMA (methyl methacrylate), EMA(ethyl methacrylate), BMA (butyl methyl methacrylate) and other epoxies, urethanes and plastics can also yield harder or tougher cements. Moreover, the addition of an emulsifier helps to better disperse the above additives in the cementitious mixture. Phosphate cements cure exothermically, generating substantial amounts of heat quickly. The heat generated by the curing phosphate cement likewise speeds the curing of endothermic plastics and plastic coatings, such as 2 part epoxies. Additionally, the heat generated by the curing phosphate cements is often sufficient to raise the energy of a system containing an exothermically curing component enough to initiate the reaction (in other words, if the system includes a component that requires an predetermined energy influx in order to begin reacting, the heat spike produced by the curing phosphate cement usually exceeds the predetermined energy influx requirement). These phosphate cements are compatible with catalysts such as BPO and will even mix with Bondo™.

It is preferred that the sprayed surface first be cleaned in order to optimize the bonding of the reactive phosphate cement. It is not necessary to abrade or acid etch a surface in preparation for cement spraying, although a wash with phosphoric acid (or other acids) or NaOH or KOH solutions does tend to enhance bonding. Other cementitious or plastic based products for overlaying concrete require that the concrete surface first be cleaned and then either etched or abraded.

A smooth surface finish may be produced by limiting the size and/or amount of the aggregate component of the cement. Also, the additions of diatomaceous earth and/or bentonite, Laponite™, hectorites, smectites, montmorillonite, Laponite™, MetaMax™, sodium or potassium silicates, fumed silica, colloidal silica, silica flour or the like may improve the surface finish without substantially diminishing the cement's strength or chemical stability. The aforementioned clays and diatomaceous earth and combinations thereof retard the initial setting or curing of the phosphate cement, as well as enhancing the flowability and workability of the cement ( i.e., producing a cement that is self-leveling and self-consolidating). Diatomaceous earth and/or bentonite additions (preferably at levels of about 0.1 to 4%) may be thoroughly mixed into the cement precursor to achieve the result of reducing the number and size of surface pores. Likewise, the surface finish may be controlled by the additions of dispersants and/or sequestrants that control the distribution of the aggregates in the mix.

Some Preferred Phosphate Cement Compositions

In one preferred embodiment, the phosphate cement composition is comprised of a non-aqueous portion and an aqueous portion. The non-aqueous portion comprises about 85% silica or other aggregate and about 15% cement paste (by wt.); wherein the cement paste consists of an acid component, a base component, and additives (mostly dispersants and retarders). One preferred retarder additive is the commercial preparation Dequest 2000™ (a dispersant and sequestrant in one). The base component includes calcined MgO, and the acid component includes equal amounts of mono potassium phosphate (MKP) and mono magnesium phosphate (MMP). The aqueous portion is at least about 50% by weight of the cement paste. The silica/aggregate component is preferably about 13% silica flour, abut 80% class "C" or class "F" fly ash, about 7% sodium and/or potassium silicate and about 10% methyl silicate and/or colloidal silica and/or fumed silica and/or silica fume and/or anhydrous silica. Using the Schutz automotive undercoating spray gun or another medium-to-large orifice gun (such as a sand-blasting gun), fine crushed gravel can be mixed in to achieve a sprayed concrete of any type, including Portland cement. Phosphate cements can also be sprayed through traditional large-scale shotcreting equipment with the additions of appropriate retarding and/or lubricating admixtures, as detailed hereinbelow.

The cement compositions may be tailored to the desired end use. For example, it is possible to activate the silica sources by treating them with about 2–5% NaOH or KOH solution or with a solution of about 2–10% phosphoric acid to increase their reactivity. Likewise, it is possible to use potassium and/or sodium silicate, in either liquid or powder form, to replace or supplement some of the other silica sources and to fill in pores.

Replacing high calcined MgO with low calcined dolomite, MgO or CaO as the base increases coating strength and reactivity. Alternately, a mixture of calcined MgO and dolomite may be used with liquid phosphoric acid or phosphate salts as the cement precursors, with total acid and base combined concentrations ranging from about 5%–60% of the total cement mixture, more preferably about 20%. Decreased acid-base concentrations mean increased water concentrations, which yields better "wetting" and slower drying, giving the acid more time to react completely with as much base as possible, resulting in an enhanced hardness with time. Using sawdust, agar, Berylex™, or celluosic fibers increases the amount of water inside the matrix, yielding a slower and longer and more complete reaction which typically results in harder and/or less porous materials.

It is also possible to partially or completely replace MgO with natural wood ashes, such as wood potash, as the base component. The use of wood ash resulted in a smooth cement finish and a very hard coating. The reaction rate is slowed by replacing part or all of the MgO with slower reacting bases such as dead-burned MgO or with ZnO, Al2O3, Fe2O3, TiO2, ZrO, ZrOH or Fe3O4.

Adding adhesive admixtures or mixtures of mono sodium phosphate (MSP) and aluminum phosphate yields a cement having enhanced adhesion, as does the addition of chlorinated polyolefin. The advantages of increased adhesion include greatly reduced rebound upon spraying and less running and dripping on vertical walls and/or ceilings. These adhesive phosphate cements make excellent mortars. For spraying overhead or vertical walls, more adhesiveness is desirable and MSP, or MSP and aluminum phosphates may be combined to replace up to 20% of the primary phosphate component of the cement.

The following admixtures, aggregates, have been found to improve or modify the properties of the phosphate cements, phosphate cements being acidbase reactive ceramic cements wherein the acid is phosphoric acid (either liquid or as a phosphate salt, usually an alkali-earth salt such as a phosphate of magnesium, calcium, sodium, aluminum, zinc, or the like or ammonia) along with a base that is usually calcined magnesium oxide, dolomite, calcium oxide or the like, although it can contain other aggregates, such as sand and/or stone. The characteristics of the resultant cementitious product, such as a coating, may be tailored through the use of one or more additives or other ingredients. For example, replacing some of the phosphoric acid/salt with nitric acid results in a modified binder system. Lithium, zirconium, and aluminum oxides are especially useful where the composite will be subject to high temperatures.

Hardness and the hardening rate of the phosphate cement coatings may be impacted by the addition of Ca, Na, or Mg fluorosilicates, multiple-phosphate salts, calcium fluoride, glass frit, zirconium hydroxide, sodium permanganate, potassium permanganate, sodium aluminate, sodium silicate, potassium silicate, silica dust, plastics, zirconium, iron and aluminum oxides, and colostrum. The replacement of magnesium phosphate with calcium phosphates instead of magnesium or potassium or using them along with Al, Mg, K, Ca Na, or Zn phosphates and sufficient water allows cementitious reactions to progress even after the cement sets up, i.e. the cement increases in hardness with time so long as there is internal moisture to drive the reaction. Alternatively, hard materials such as diamond, silicon carbide, boron nitride, tungsten carbide, molybdenum metal and/or oxide, and the like may be added into the mix to provide an additional composite or quasi-composite phase. Ultrafine particles of fly ash, silicon boride, silicon carbide, boron carbide, aluminum nitride, aluminum oxide, and hard metals in the cement matrix also have the effect of increasing the hardness of the resultant cement body or coating. These particles are preferably spherical and may also be pretreated with KOH or NaOH (or nitric, phosphoric or hydrochloric acids or combinations of these acids) to increase their effectiveness.

Other additives that increase the hardness of the phosphate cement compositions include: oxides of aluminum, manganese, molybdenum, nickel, chromium and vanadium, aluminum paste, zinc-aluminum paste, tin, colostrum, iron ore concentrate or iron oxides alone or in combination with aluminum. Also, solvents added to the slurry or spread on the hardened cements of above compositions can be ignited to rapidly cure and density the composites. These composites can be made in-situ, resulting in very hard net-shape products. These phosphate cements can be added integrally to ordinary Portland cement materials.

The process of spraying concrete may also act to increase its density. The density of sprayed phosphate cements may also be influenced by such factors as the particle size distribution, or PSD, of the component materials, temperature of the mix and surfaces, the reactivity of the mix, and the amount of air mixed into the spray jet.

The use of chemical retarders to regulate the reaction rate is important. The use of retarders, along with maintaining smaller particle sizes of the components and maintaining a low temperature cement system, is important in making cements sprayable. However, smaller particle size means more surface area and faster reaction, setting and hardening. Reaction rate may therefore be controlled through variations of the PSDs of the precursors. Further, precise temperature control is not always feasible, especially regarding large scale construction projects and applications subject to temperature extremes, such as from the weather. Thus, the use of retarders, alone or with particle size reduction and/or temperature control, is the preferred means of controlling the reaction rate of the phosphate cement coatings. Accelerators are useful in very cold weather; the present material can be sprayed down to 20 degrees Fahrenheit.

The following as retarders have proven effective in the control/slowing of the reaction rate of phosphate cements: tartaric acid, citric acid, acetic acid, boric acid, Borax™, fine rice husk ash (RHA), Berylex™; agar, superplasticizers, water reducers, TSP, calcium citrate, colostrum, calcium fluoride, sodium fluoride, soy emulsifiers, pyrophosphates, distilled water, deionized water, Dequest 2000™ and Dequest 2006™ (available from the Solutia Company), water swelling clays, Laponite™, diatomaceous earth and/or betonite (or other water retaining clay which can be calcined), sodium carboxy-methycellulose (CMC), cellulose, phosphonates and mixtures thereof. A dispersant offers increased reaction rate control of phosphate cements, and is used in much higher quantities than with Portland cement to achieve the same level of control. During spraying, retarders and sequestrants are particularly important, since physical intermixture of the cement precursors (the acid and the base components) that occurs during mixing and physical spraying drives the curing reaction even faster, causing heat buildup in the spraying equipment, further driving the reaction. These sprayed phosphate cements are excellent overcoats/topcoats for Portland cement concrete and asphalt, and they often eliminate the need for re-paving. Also a thin coat over freshly poured Portland cement concrete eliminates the need for curing compounds and speeds initial set while keeping the Portland cement moist, thereby producing stronger Portland cement concrete with fewer cracks and a harder less porous surface.

Alternately, reaction rate may be controlled by using a less active base, such as zinc oxide, zirconium oxide, zirconium silicate, high burn calcined magnesium oxide, iron oxide, or titanium oxide to slow down the reaction and yield more pot life. Likewise, a less reactive phosphate salt (such as phosphates of potassium or zinc) may be used to control the reaction rate.

Another means of reaction rate control to increase pot life is to use larger particle sizes for the cement precursors and additives. Larger particles decrease the effective surface area for a given volume or mass of reactants, thereby slowing the reaction rate. Further means of slowing/controlling the cementitious reaction include using slower acting phosphate salts of Zn or K in addition to or in replacement of the above-mentioned salts and using distilled, de-ionized and oxygenated water instead of standard tap water. Alternately, additions of Berylex™, agar, colostrum or cellulose or combinations thereof may be used to slow the cementitious reaction. Additionally, it should be remembered that by keeping the acid and the base components separated, pot life is increased.

Using the above described retarders and retardation techniques, phosphate cement slurries may produced that can be sprayed, troweled, dipped, brushed, flowed, vibrated, stirred or otherwise placed; the slurries so produced tend to be self-leveling and can be self-filled into forms.

Conversely, it is sometimes desirable to accelerate the curing of the cement coating. This may be accomplished by using accelerants. Some accelerants include additions of a stronger acid, or by adding more or more highly concentrated acid, nitric acid, salt solutions such as sodium chloride or calcium chloride, more and/or smaller seed crystals, aluminum, tin, tin oxide, faster reacting oxides, calcium carbonate, carbonated water, and/or heated water to the cement components or admixture. It should be noted that in the case of solid accelerants, the effectiveness of the accelerant increases with its surface area to volume ratio. Additionally, warming the target substrate surface will likewise accelerate the cementitious reactions. Other accelerator additives include MgOH, NaOH, CaO, CaOH, AlOH$_3$, and/or KOH additives. Hydrogen peroxide, and/or sodium permanganate also speed set and hardening, as does metallic tin, and Cascade™ detergent.

The sprayable cement components may be made less abrasive, so as to extend the life of the sprayer equipment, by using silica flour, silica fume, class F and C fly ashes, fumed silica and/or colloidal silica instead of coarser sand particles as aggregates. Additions of diatomaceous earth and/or bentonite clay (or the like), in addition to smoothing the surface finish, also act as excellent retarders and sequestrant and improve the flowability of the phosphate cement slurry.

The appearance of the phosphate cement spray coating may be aesthetically improved by using colorants and/or less abrasive additive materials (see above). Patterns, both of different colors and of different textures and combinations thereof, may be introduced through additives. For example, a faux marble and/or faux granite look may be created by the introduction of excess MgO and colorants that do not disperse evenly, for example aquamarine blue and others that are not wholly water soluble. This makes beautiful randomly shaped swirls. Sprinkling colorants on the coating while it is still wet is also possible. The final finish is as variable as an artist's canvas. Wood potash, NaOH, KOH, MMA (methyl methacrylate), EMA (ethyl methacrylate) and other plastics as additives yield a smoother finish, while the additions of EMA and MMA also yield a harder finish. Additions of organic acids such as vinegar yield smooth finishes. Colloidal silica, fumed silica, small sized class F fly ash, and silica fume additives all yield smoother finishes and coatings having less open porosity, providing increased water resistance and better encapsulation of cements, mortars, and concretes. The addition of boric acid, as in ceramic pottery, creates a glaze. The additions of plastics (polymers, elastomers, resins and the like) typically yield nonporous cements having enhanced flexibility and improved fracture, compressive, and tensile strengths. Asphalt, Renolith™, Elvaloy™, ethylene terpolymer, ketone ethylene ester, tin, and polymer additives such as BMA and EMA also may be added to Portland cement, yielding similar results; the Portland cement may be poured or sprayed. The addition of the above-listed plastic and/or elastomeric materials, such as Elvaloy™ or rubber particles, into a phosphate ceramic coating enables these strong cements to be sprayed onto materials such as asphalt, roofing, and the like that experience compression. Phosphate cement coatings containing such elastomeric and/or plastic additions are less susceptible to the damaging effects of thermal cycling (repeated stressing of the material due to differential thermal expansion of the coating and substrate), and accordingly extend the life of the coated substrate. In other words, the elastomeric and/or plastic particles distributed throughout the phosphate cement matrix act to absorb some of the compressive and/or tensile forces acting on the cement due to the presence of heavy loads thereon or thermal cycling, thereby reducing the incidence of crack formation and propagation and of material creep. It should be noted that some of these additions, such as Elvaloy™, require an energy influx in order to initiate polymerization or "setting up"; this energy influx is satisfied by the exothermic heat of curing of the phosphate cement.

Using nanophase particles produces a smoother finish; if the composition nanophase particles includes oxides or hydroxides of Na, K, or Mg the nanophase particles can additionally act as catalysts in phosphate and/or Portland cement compositions.

Defoamers and ceramic additives can be used to smooth out and eliminate the pinholes and gas bubbles in ammonium phosphate cement, enhancing the appearance and reducing the porosity of this phosphate cement.

A glaze may be achieved through additions of boric oxide, sodium or potassium silicates, finely powdered mineral colorants, or commercial or artistic glazes into the phosphate cement slurry. Such glazes may be used on surfaces including, but not limited to, wood, metal, Portland cement concrete, drywall, Styrofoam™ insulation, plywood, Dry-Vit™, plaster, stucco, adobe, shingles, shakes, roofing materials, basement walls, cement bricks and blocks, and ceramic bricks.

Different aggregates added to the cement mix change the appearance, strengths, costs, rheology, and may also change the equipment requirements. For instance, hard materials such as glasses or metal oxides may be added to form a second phase in the cement, imparting increased hardness properties to the final product. Likewise, fibers, such as metal or graphite fibers, may be added to the spray mix to form a sprayed fiber-reinforced cement composite, having enhanced toughness properties.

Using the two-stage method, additives such as agar, clay, bentonite, fine sawdust, starch, small wood chips/fibers, cellulosic material, methyl cellulose, soy dispersant, trisodium phosphate, aluminum and sodium phosphates, and thickeners result in increased adhesion and/or increased cushioning and encapsulating and holding effects upon the aggregate and upon the sprayed cement as a whole, thereby reducing rebound. Kelco-Crete™ or other gums used along with water reducers help to prevent washout of cement fines in underwater construction projects.

The addition of water in an amount sufficient to substantially match the viscosity of the slurry to that of water-based acrylic paints or enamels increases the sprayability of the cement mixture and slows the reaction rate of the coating. The particles are maintained in suspension/emulsion/gel state via the acid-base reaction. Thickeners such as silica flour, cellulosic materials, methylcellulose, sawdust, flocculents, cornstarch, wheat starch, powdered gelatin, agar, polyurethane and Berylex™ may be added to maintain a viscosity suitable for spray coating. Soy lecithin has been found to be an excellent wetting agent and emulsifier. Other emulsifiers include high-wetting cellulose fiber, yielding high bulking for more air entraining and longer wetting time (the mush makes for a soft place to hold more cement and to cushion the silica/aggregate hitting the hard surface of application, hence preventing rebound), starch (wheat or corn) along with soy. One preferred source of soy is ADM (Archer Daniel Midland) Ross & Rowe Lecithins: R & R 551 Soy Lecithin™. R & R 551 contains soy lecithin, nonionic surfactant and propylene glycol and acetone insolubles and KOH. R & R 551 is non-edible and disperses and emulsifies. R & R 551 is used as a wetting and suspending agent in water based paints and is highly dispersible. Another preferred emulsifier/wetting agent is ADM's Yelkin TS. The above-listed ADM products also supply carbon (a good hydrophobe), as does wood potash, saw dust and carbon black. The use of an emulsifier enables the mixing of the phosphate binder and/or surfactants with non-aqueous plastic finishes, such as epoxies, urethanes and other solvent-based coatings, and elastomeric or hard plastics. These phosphate cements also act as a filler in plastic adding compressive strength and speeding set times, all while being inexpensive and allowing for the forming or injection of net shaped parts in-situ without the need for firing or maching.

The toughness and/or resistance to fracture may be increased through the additions of polymer powders or granules (i.e., rubber particles) to the cement precursors. Adding from about 1% to about 50% of elastic, shock-absorbing materials can significantly increase the shear, fracture, and tensile strength of the resulting cement composition, especially if the elastomeric material does not deform under the shock. This effect is not limited to phosphate cements, although in bulk applications it must be recognized that the compressive strength and other cement bonding related properties may suffer as higher percentages of toughness additives are added. These disadvantages are partially mitigated by the thin-film nature of phosphate cement sprays, making the use of toughness increasing additives particularly attractive therein. Some toughness-enhancing additive compositions include, but are not limited to: polyvinyl acetate (PVA); a mixture of PVA and boric acid or sodium tetraborate (preferably about 2:1); a mixture of PVA and liquid starch (preferably about 1:1); a mixture of PVA and boric acid or sodium tetraborate; and ground hard rubber/rubber crumbs. Also, some commercial products, such as foams and the New Balance company's ABZORB™ product which is a shock absorbing polyurethane elastomeric which absorbs the shock with little or no displacement/deformation to the shock absorbing materials. Archer Daniel Midland's R 551 soy emulsifier product and other emulsifiers have been found to assist in the distributing these elastomeric products evenly throughout the cements. Moreover, in addition to providing enhanced toughness and crack-resistance in the cured cementitious coatings, the additions of the toughness enhancing polymer particles also decrease rebound problems during spraying, enhancing the adhesion of the sprayed on phosphate cement coating to the target.

Hardware

The present invention works in all types of commercial sprayers/guns, even such sprayers as automotive-industry spray guns made to spray thin solvent coatings such as lacquers, enamels and urethanes and also water based coatings such as acrylics. The only spray equipment now available is designed for "shotcreting" and is very large, expensive and inefficient. As much as 40% of the "shotcreted" material is lost to rebound, and the product can only be applied in very thick and rough surfaced layers.

Until now, it was not possible to spray cements using coating guns because the cement thickness and viscosity were too great, resulting in a clogging of the paint guns' needle valves and spray tips and internal flow piping. Moreover, the sand and abrasive oxides in the cement catastrophically abrades the needle valves and spray tips of traditional spraying equipment. Increasing the amount of retarders and sequestrants allows the spraying of fine aggregates such as silica flour, silica fume and precipitated silicas to make fine, thin and attractive spray coatings. If particularly abrasive materials are sprayed, the spray gun components (valves, tips, etc.) may have to be accordingly hardened.

The preferred sprayer for the above-described phosphate cements is the 3M BODY SHUTZ APPLICATOR GUN™, a very inexpensive product of the 3M Corporation, sold as part no. 08997 from 3M's Adhesives, Coatings and Sealers Division/3M in St. Paul Minn. 55144. The 3M SHUTZ gun is made to coat auto rocker panels with "chip resistance" coatings. The gun has no spray tip and a large orifice and few moving parts to clog up or wear out. With large diameter flow, short flow length, no spray tip and no spray orifice, clogging or packing up of the gun is greatly reduced and when it does it can be easily flushed.

For fine spraying, any paint or automotive paint gun may be used with compositions containing sufficiently low amounts of abrasives (such as sand or stone). The silica sources for fine spray compositions are preferentially silica fume, fly ashes, sodium silicate, potassium silicate, and/or fumed silica, amorphous silica or colloidal silica as a replacement for the sand. This results in much less abrasion to the spray gun, less packing up and/or clogging of the gun, eliminates rebound, and makes a fairly smooth surface. About 5–10% NaOH or KOH may be added to the sodium or potassium silicate and mixed in prior to adding it to the mix for smoother spraying.

Other sprayers useful with the present invention include standard air pressure paint guns, portable hand pump pressurized garden type sprayers, HVLP guns, airless guns, pumps, sand blasting guns, shotcrete guns, gravity fed guns and suction type guns.

It should be noted that the phosphate cement slurry behaves thixotropically, and that the thixotopic character of the slurry may be modified and controlled through the use of thixotropic additives. Accordingly, the pot life of the slurry may be extended by stirring (either by hand or mechanically) or vibrating the slurry. Moreover, the spray gun used to apply the phosphate cement may be configured to agitate or to otherwise provide turbulence to the slurry contained therein to likewise extend its pot life. These phosphate cements and coatings are self-leveling and self-consolidating.

Applications

Figure 2:
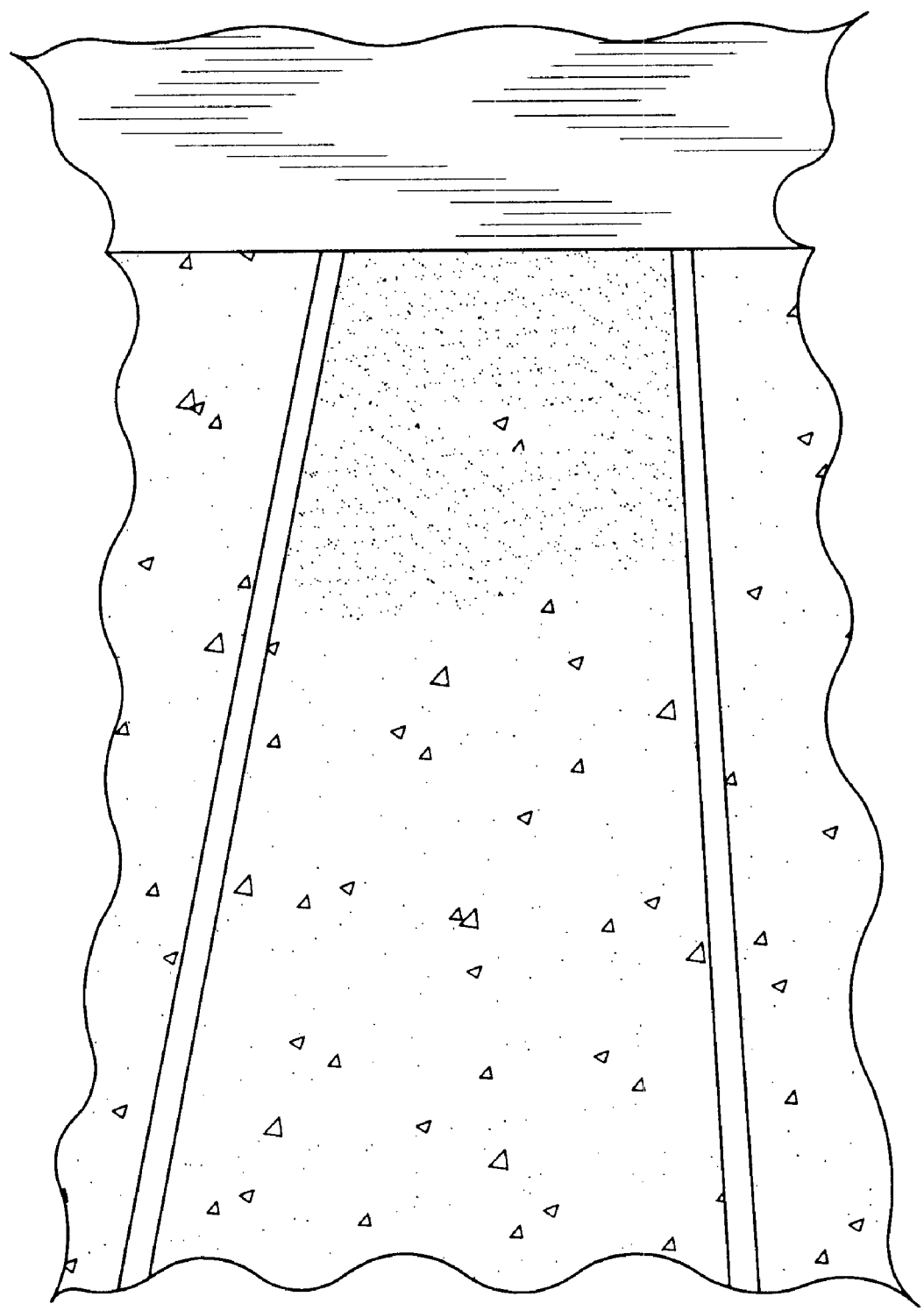
FIG. 2 is a first perspective view of four different phosphate cement spray coatings on a concrete floor.
Figure 3:
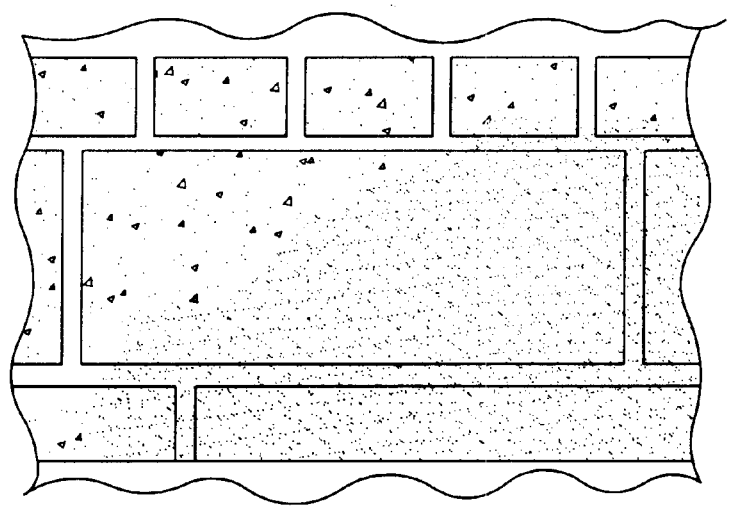
FIG. 3 is an enlarged perspective view of two of the phosphate coatings of FIG. 2.
Figure 4:
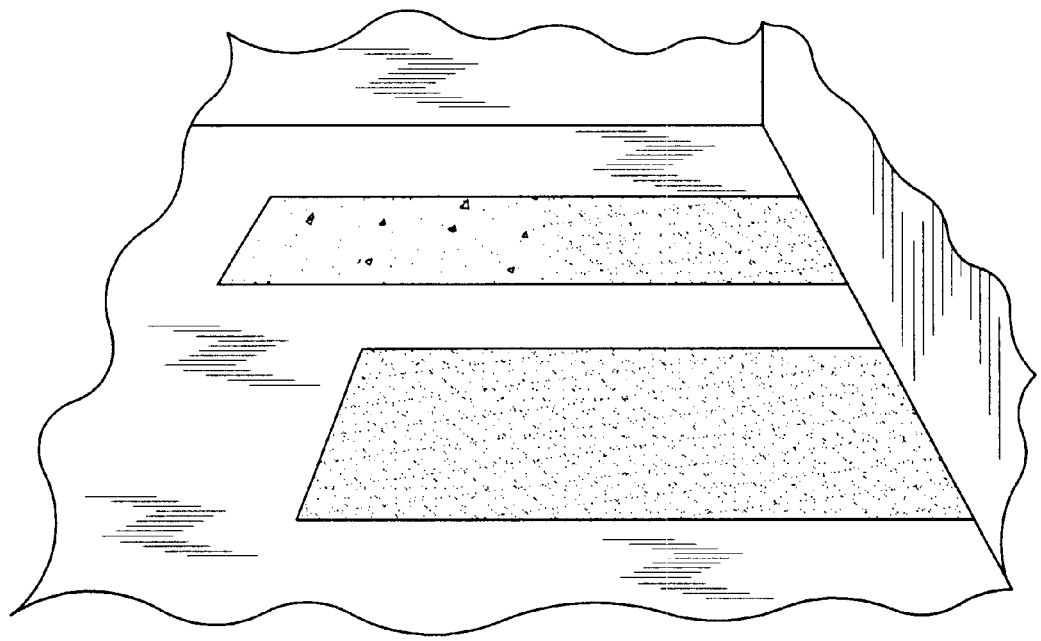
FIG. 4 is a perspective view of a sprayed-on phosphate cement coating partially covering a brick and mortar wall.

The following is a non-comprehensive discussion of some of the possible uses of phosphate cement coatings, both as sprayed and as otherwise applied. In addition to the traditional cement uses (blocks, slabs, and the like), the present invention may be used in the following applications:

Coatings—for floors and slabs (see FIGS. 1–3), overcoating roads, driveways, parking garage decks and ramps, bridge decks and sidewalks along with replacement of ceramic tiles, building walls (both inside and outside), drywall and plasters, plywood, siding, roof plywood, shingles both cedar shake and asphalt, coating asphalt and all concrete surfaces. The rougher the surface, having more surface area, the stronger the bond to the surface it is applied to. Coating properties such as flexibility and toughness may be modified through the additions of appropriate amounts of additives to minimize the effects of differential thermal expansion and/or the inherent flexibility of the coated member.

The present invention may be used for waterproofing and decoration. For example, basement walls may be coated to prevent water penetration and also to provide a quick finish if the spray has a white or other colorant component, thereby removing the requirement of framing and drywalling. Also, the exterior of houses and commercial buildings may be coated with phosphate cement in lieu of wood siding or brick or stone by putting up foam insulation and coating it with a rough coat ("scratch coat") of Portland cement plaster or phosphate cement, followed by a finish coat of phosphate cement.

Additionally, elements of the present invention may be combined with traditional paints to provide painted coatings having enhanced adhesion and wear properties. Additions of phosphate salts, either alone or with oxides and either in powder or liquid form, to traditional liquid paint compositions, produce a paint composition with enhanced adhesion, toughness, water resistance, chemical stability, oxidation resistance, durability and an increase in overall lifetime. The addition of phosphate salts or binders to paints cause a chemical reaction with oxide and/or carbonate components to yield an elastomeric ceramic coating that is chemically bonded to the substrate. The coating has the advantage of remaining breathable while enjoying increased flexibility, thermal cycling and creep resistance, and toughness. Optionally, additional silica may be added to even further enhance the durability of the coating. These phosphate binders when added to silicate coatings will strengthen them and make them sufficiently hard and waterproof to coat concrete floors (such as warehouse floors), bridges and parking decks.

Roofing—the present invention can be sprayed right over the plywood or other roof "decking" as it is fireproof and water proof and can be made any desired color (or put on two-toned). This entirely eliminates the need for: shingles, cedar shakes, roof tiles, metal roofs, siding, exterior or interior painting, and the like. Holding strips, wire, or mesh may be tacked to the roof surface to provide a textured substrate for the sprayed cement, allowing enhanced adhesion. A plastic pattern or form may be used with the cement spray to modify the appearance of the cement coating to produce to illusion of slate, wood shakes, or tile. A plastic pattern can be used, just as is now used to for over coating concrete with Portland cements or concretes (which have no reactive adherence and often have thermal cycling problems), to make the "covered over area" which prevents the coating from touching the concrete surface, look like "mortar joints" between the faux paving brick, cobblestone or slate appearing concrete surfaces. A brown or reddish brown colorant provides an attractive way to waterproof aged cedar shake roofs, eliminating the need for expensive re-roofing. Old cedar shakes provide the irregular pattern and depth and thus the classic look is not lost. Cedar shake roofs and expensive and slate roof tiles and clay roof tiles are very expensive. Cement roof tiles are expensive and heavy and the cement and cedar and slate all require much skilled labor. For walls, the present invention phosphate cement coatings may be made to resemble marble also. Both interior and exterior walls may benefit from cement spray coating. Shingle, tar, asphalt, tar paper, wood, plywood or sheathing board roof materials can be spray coated with phosphate cement to eliminate tearoffs and the need for replacement roofing. Reflective or absorbing pigments (such as white or black pigments) may be added to decrease or increase the heat absorbing properties of the coating to saves on energy bills (depending upon the ambient environment); likewise, the coatings may be formulated to be air entraining to further enhance their thermal insulating properties.

This phosphate cement spray coating works well for mortaring bricks and adhering the layers of laminate materials. The spray coating also works well to cover asbestos or silica dust-containing insulation to encapsulate the asbestos or silica dust, and even chemically bond the dust into the cement matrix.

Prefabricated or temporary structures may be produced by spray coating insulation foam blocks and/or forms in situ with a phosphate cement coating. The cement adds strength, durability, waterproofing, fireproofing, and thermal insulation (air entrainment) to a structure. The cement coating also acts as an adhesive to hold the structure together, eliminating the need for conventional fasteners.

Sprayed phosphate cement coatings can also be used to reinforce and waterproof drywall, which is susceptible to water damage and has little structural strength of its own and must be painted even for interior use. Also, the hard coating strengthens and adds life to drywall, which can easily be penetrated by a pencil.

Tuckpointing—phosphate mortars and cements strongly adhere to old mortar in the joint and to adjoining brick or cement blocks, and can be sprayed or squeezed into the joint. Portland cement mortars suffer from the disadvantage of having to be slowed applied into the joint from a small palette or mortar board with a small, thin trowel, a process that is time consuming and labor intensive. The porous highly air entrained Portland cement mortar is the weakest and most porous part of a brick wall. The phosphate cement slurries of the present invention are faster and easier to use, stronger, tougher, less labor intensive and less porous than ordinary Portland cements.

Exhaust and heat shielding—Dipping or spraying a thin coating of phosphate cement on exhaust pipes, engine parts, space travel vehicles, aircraft shells, rocket coatings, mufflers, catalytic converters, exhauster headers and manifolds, yields a ceramic coating on the inside, the outside, or both. The coating protects the metal from chemical attack as well provides thermal insulation. Phosphate coatings can also provide ceramic protection of furnaces, heat ducts and other heat generating and heat carrying equipment. Phosphate cement coatings may also provide the fire protection of building materials, including structural steel.

Environment—coating heavy metals, walls of sewer and septic systems, interior and exteriors of man holes, pre-coating concrete pipe so it is more water proof and resistant to corrosive chemical (acid and alkali) environments. Concrete water pipe that is not waterproofed loses an astoundingly high percentage of water, as it is very porous. Phosphate cement may also be sprayed or otherwise coated onto asbestos—containing structural members to encapsulate the asbestos and reduce or prevent the incidence of exposure.

Pavement—the present invention can be used as a concrete, mortar, cement or coating and as a strong inert aggregate or as a filler material in other materials such as in plastics, other cements, and concretes. The phosphate cement of present invention bonds to itself, concrete, and asphalt and can be aesthetically colored with oxides or other colorants. Adding a cement coating to asphalt provides the benefits of increasing the surface hardness, reducing surface cracking, decreasing water and chemical intrusion, decreasing rutting and buckling caused by softening asphalt in high temperatures, and prevents "sweating" of tar and oil from the asphalt surface, increasing road life and decreasing skid risks. Light colorants could be added to reflect away light and decrease road temperature.

Filling the cracks and spalling in concrete pavements along with patching the pot holes and then coating the surface with the present invention can often avoid the need for tearing out the old concrete and re-paving the road saving vast amounts of tax monies.

Curing concrete—spray phosphate cements on top of OPC (ordinary Portland cement concrete) when the bleed water disappears or is nearly dried up, and that holds curing water in the OPC, resulting a slower and more complete curing reaction and harder concrete. It also yields a harder and more chemically stable phosphate surface coating. The phosphate coating further resists road salt (calcium chloride) and water, protecting included rebar from rust. Further, spraying phosphoric acid on the top of the concrete reacts with free CaO and CaOH to make an in situ coating that penetrates and chemically binds to the Portland cement pavement or slab.

Coating the hulls of ships to protect them from rust, salt water, and barnacles making for less maintenance, less downtime, and possible slightly better speed through the water.

Rust resistance/conversion—phosphate cements convert the ferric rust (iron oxides) to inert iron phosphate silicates. Preferably, for rust conversion, Ca and K nitrates and/or nitrites are added to the cement. The encapsulating and non-porous and pH neutral (the pH can be easily tailored) features of this reactive cement can all contribute to preventing the rusting of steel reinforcement within the concrete. Dipping or spraying new or rusty iron rebar or structural steel members with these phosphate cement coatings (especially ones containing silica fume, fumed silica, and/or reactive clay), yields reinforcing members that are impervious to water and salt corruption and chemical attack.

Preferred Mixing Process

The following steps describe one preferred mixing process:

a) add the retardants: reducers, wetting agents, superplasticizer, buffers, water reducers, sequestrants or combinations of same to the water(preferably de-ionized or distilled water) which has been chilled or to which crushed ice or crushed dry ice has been added;

b) add the base(s); of calcined high burn MgO by itself or with other bases such as Na or K silicate either the acid or acidic salt (potassium or other alkali metal salts or ammonium phosphates) to the water and mix it in until it dissolves; and c) add either the acid or acidic salt (potassium or other alkali metal salts or ammonium phosphates) to the water and mix it in until it dissolves; preferred for spraying: 100 of acid=80% potassium phosphate.

It should be noted that by not putting the acid and the base together, all of the total mix time except step c is added onto the "pot life".

When using plastic additives, the following steps are added to a, b, and c above: a polymerizing agent or initiator may be added to either the first or second constituent to introduce polymer additives to the resulting phosphate cement. The polymer initiators/polymerizing agents may be introduced into either constituent, i.e. into either the acidic or base component, regardless of the order in which they are used. Alternately, the plastic additives may be introduced as described below:

d) after the acid is added per step (c) and thoroughly mixed in, add in desired plastic and mix; optionally, catalyst and/or polymer initiator may be admixed at this time; or e) catalyst and/or polymer initiator is added last and mixed.

For Portland cement based mortars, cements and concretes and for gypsum and aluminum and blended cements, the mixing process is simplified. The retarders/sequestrants are added to the water first (although that is not necessary, they can be added to the dry cement) then water is added and the slurry mixed. Desired plastics or other additives are mixed in last.

Color may be added to any of these cementitious sprays, mortars or concretes at any time during the mix cycle, but with the phosphate cements colorants are preferentially added as dry mineral powders or liquid colorants after step (c) above.

For phosphate cements as premixed powders or for pre-mixed powders with aggregate, perform step (a) and then add in the water and mix it.

Agglomeration is reduced if the acid is added in slowly to the mixer or hand mixed thereinto, thus lengthening pot life and yielding a smoother and stronger coating.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are to be desired to be protected.

I claim:

1. A method of producing a phosphate cement coating, comprising the steps of:
   a) providing a surface to be spray coated;
   b) providing a first cementitious constituent;
   c) providing a second cementitious constituent adapted to combine with the first cementitious constituent to produce a phosphate cement coating;
   d) spraying the surface with the first cementitious constituent;
   e) spraying the surface with the second cementitious constituent;
   f) reacting the first and second cementitious constituents to produce a phosphate cement coating.

2. The method of claim 1 wherein the first constituent is a phosphoric acid and the second constituent is a metallic base.

3. The method of claim 2 wherein the first constituent includes at least one of the following group: potassium phosphate, calcium phosphate, magnesium phosphate, sodium phosphate, aluminum phosphate, zinc phosphate; and wherein the second constituent includes at least one of the following group: magnesium oxide, magnesium hydroxide, calcium hydroxide, zirconium oxide, zirconium hydroxide, potassium hydroxide, sodium hydroxide, dolomite, zinc oxide, aluminum oxide, potash, calcium oxide, lithium carbonate, barium carbonate, molybdenum oxide, aluminum hydroxide, tin oxide, tin, nickel oxide, iron oxide, titanium oxide, or wood ash.

4. The method of claim 1 wherein the first constituent is a metallic base and the second constituent is a phosphoric acid.

5. The method of claim 4 wherein the first constituent includes at least one of the following group: magnesium oxide, magnesium hydroxide, calcium hydroxide, zirconium oxide, zirconium hydroxide, potassium hydroxide, sodium hydroxide, dolomite, zinc oxide, aluminum oxide, iron oxide, titanium oxide, wood ash; and wherein the second constituent includes at least one of the following: potassium phosphate, magnesium phosphate, zinc phosphate, ammonium phosphate, sodium phosphate, calcium phosphate, iron phosphate.

6. The method of claim 1 further comprising the step of:
   after step c) and before step d), adding at least one of the following to the first constituent: a retardant, an accelerant, a reducer, a wetting agent, a superplasticizer, a buffer, a water reducer, an adhesive agent, an air entraining agent, a hardening agent, a toughening agent and a sequestrant.

7. The method of claim 6:
   wherein the retardant comprises at least one of the following: citric acid, acetic acid, boric acid, fine rice husk ash, chilled water, tri-sodium phosphate, colostrum, distilled water, deionized water, calcium citrate, calcium fluoride, sodium fluoride, tartaric acid, bentonite, diatomaceous earth, sodium carboxy-methycellulose, cellulose, and agar;
   wherein the accelerant comprises at least one of the following: nitric acid, sodium chloride, calcium chloride, tin, tin oxide, calcium carbonate, carbonated water, hydrogen peroxide, potassium permanganate, sodium permanganate, sodium silicate, potassium silicate, sodium aluminate, aluminum hydroxide and heated water;
   wherein the adhesive agent comprises at least one of the following: sodium phosphate, aluminum phosphate;
   wherein the hardening agent comprises at least one of the following: calcium fluorosilicate, sodium fluorosilicate, magnesium fluorosilicate, silicon carbide, boron nitride, tungsten carbide, molybdenum, molybdenum oxide, nickel oxide, chromium oxide, vanadium oxide, aluminum, diamond, magnesium phosphate, sodium phosphate, zinc phosphate, colostrum, and aluminum phosphate; and
   wherein the toughening agent comprises at least one of the following: polyvinyl acetate and ground hard rubber.

8. The method of claim 1, further comprising the step of:
   after step c) and before step d) adding a polymerizing agent to the first constituent.

9. The method of claim 8, further comprising the step of:
   after step c) and before step d) adding a polymer initiator to the second constituent.

10. The method of claim 1 wherein the surface is heated.

11. The method of claim 1 wherein the surface is cooled.

12. The method of claim 1 wherein the steps d) and e) occur substantially simultaneously and wherein the first and second constituents intermix during spraying.

13. The method of claim 1 further comprising the step:
   after step c) and before step d) mixing the first and the second constituents;
   wherein steps d) and e) occur substantially simultaneously.

14. The method of claim 1 wherein at least one of the constituents is heated.

15. The method of claim 1 wherein at least one of the constituents is cooled.

16. The method of claim 1 further comprising the step:
   after step c and before step d adding a colorant to the first constituent.

* * * * *